(12) United States Patent
Samingprai et al.

(10) Patent No.: US 9,145,464 B2
(45) Date of Patent: Sep. 29, 2015

(54) MAGNESIUM HALIDE SUPPORT FOR USE AS A COMPOSITION OF A CATALYST FOR THE OLEFIN POLYMERIZATION, AND METHOD OF PREPARATION OF THE MAGNESIUM HALIDE SUPPORT

(75) Inventors: Sutheerawat Samingprai, Bangkok (TH); Worawat Chuencheep, Bangkok (TH); Pattiya Suttipitakwong, Bangkok (TH); Chaya Chandavasu, Bangkok (TH)

(73) Assignee: PTT Global Chemical PCL, Bangkok (TH)

( * ) Notice: Subject to any disclaimer, the term of this patent is extended or adjusted under 35 U.S.C. 154(b) by 324 days.

(21) Appl. No.: 13/996,010

(22) PCT Filed: Dec. 21, 2011

(86) PCT No.: PCT/TH2011/000051
§ 371 (c)(1),
(2), (4) Date: Jun. 20, 2013

(87) PCT Pub. No.: WO2012/099549
PCT Pub. Date: Jul. 26, 2012

(65) Prior Publication Data
US 2013/0274098 A1    Oct. 17, 2013

(30) Foreign Application Priority Data
Dec. 22, 2010   (TH) .................. 1001001960

(51) Int. Cl.
*C01F 5/26*  (2006.01)
*B01J 32/00*  (2006.01)
*C08F 4/10*  (2006.01)
*C08F 10/00*  (2006.01)
*C08F 4/50*  (2006.01)

(52) U.S. Cl.
CPC ... *C08F 4/10* (2013.01); *C08F 4/50* (2013.01); *C08F 10/00* (2013.01)

(58) Field of Classification Search
CPC .................... C01F 5/26; B01J 32/00
USPC .................................. 423/155, 178
See application file for complete search history.

(56) References Cited

U.S. PATENT DOCUMENTS

| | | | | |
|---|---|---|---|---|
| 3,067,006 A | * | 12/1962 | Ebert et al. | 423/178 |
| 5,120,514 A | * | 6/1992 | Tveten et al. | 423/155 |
| 6,042,794 A | * | 3/2000 | Amundsen et al. | 423/155 |
| 2010/0056370 A1 | * | 3/2010 | Shigyo et al. | 502/439 |

FOREIGN PATENT DOCUMENTS

| | | |
|---|---|---|
| EP | 0018737 A1 | 11/1980 |
| EP | 1308466 A1 | 5/2003 |
| WO | 2008140853 A2 | 11/2008 |

OTHER PUBLICATIONS

Singh, "Upper Critical Solution Temperatures for Immiscible Solvent Systems with Halide Salts, Carboxylic Acids, Surfactants and Polynuclear Aromatic Compounds and Benzene Derivatives", Journal of Chemical Thermodynamics, Academic Press, London, GB, vol. 39, No. 2, Jan. 4, 2007, pp. 240-246.
Bernabe-Zafon V et al.: "On the Determination of Underivatised Fatty Alcohol Ethoxylates by Electrospray Ionisation-Mass Spectometry", Journal of Chromatography, Elsevier Science Publishers B.V, NL, vol. 1118, No. 2, Jun. 23, 2006, pp. 188-198.
International Search Report issued Feb. 29, 2012 in International Application No. PCT/TH2011/000051.
International Preliminary Report on Patentability issued on Apr. 11, 2013 in International Application No. PCT/TH2011/000051.

* cited by examiner

*Primary Examiner* — Timothy Vanoy
(74) *Attorney, Agent, or Firm* — Kim Winston LLP

(57) ABSTRACT

An aspect of the present invention is a preparation of a magnesium halide support for using as a composition of a catalyst in an olefin polymerization, wherein the magnesium halide support is a solid substance prepared by an aliphatic alcohol non-ionic surfactant, preferably is ethoxylated aliphatic alcohol. Another aspect of the present invention is a method for the preparation of the magnesium halide support for using as the composition of the catalyst in the olefin polymerization comprising the following steps: (a) adding a magnesium halide compound into an organic solvent, and heating; (b) cooling down the mixture from (a) rapidly to the room temperature or lower in the inert organic solvent and the aliphatic alcohol non-ionic surfactant; and (c) washing the magnesium halide with the anhydrous inert organic solvent, and drying, wherein the aliphatic alcohol non-ionic surfactant is ethoxylated aliphatic alcohol.

27 Claims, 4 Drawing Sheets

MAGNESIUM HALIDE SUPPORT FOR USE AS A COMPOSITION OF A CATALYST FOR THE OLEFIN POLYMERIZATION, AND METHOD OF PREPARATION OF THE MAGNESIUM HALIDE SUPPORT

CROSS-REFERENCE TO RELATED APPLICATION

This application is a U.S. national phase application under 35 U.S.C. §371 of International Application No. PCT/TH2011/000051 filed on Dec. 21, 2011, which is hereby incorporated by reference in its entirety.

FIELD OF THE INVENTION

The present invention is in the field of Chemistry, which involves chemical mixtures and processes. This invention relates to a magnesium halide support for using as a composition of a catalyst in an olefin polymerization, and a process for preparing said magnesium halide support.

BACKGROUND OF THE INVENTION

The formation of dust particles during a polymerization process is one of the important problems in the plastic production industry. Said dust particles derived from polymer with very small particle size i.e. the polymer with particle sizes which are smaller than 75 micrometer. If the dusts particles are presence in large amount, they tend to obstruct a continuous response of the production process, thereby, affecting a translocation of the polymer in the supply tube to be stuck and damaging the production process. Generally, there are several methods to get rid of these dust particles, for example, using a sieve and a fan to blow away these dust particles, or installing a filter in the polymer production process. However, it was found that there are some limitations to of those methods in order to effectively and efficiently remove all dust particles. Moreover, utilization of those methods tends to complicate the production process as well as 1 increase production cost. Therefore, prevention or minimization of the formation of said dust particles is more preferable.

It is known that the shape and size of polymer and catalyst, and distribution of polymer are correlated with each other, as disclosed in Ludwig L. Bohm, Angew. Chem. Int. Ed. 2003, 42, 5010-5030. That is, if the catalyst has a spherical shape and a narrow particle size distribution, it would lead to the production of the same spherical shape and narrow particle size distribution of the polymer as well. Therefore, there have been efforts to improve the size and shape of the polymer through uses of the catalyst with suitable size and shape. Japanese Patent Number 6-287217 discloses a production process of an olefin polymer, which utilizes a solid catalyst compound to obtain a polyolefin with a spherical-like shape and with a narrow range of distribution diameter. Furthermore, there is no polymer that is smaller than 200 µm, produced as yet through the process which utilizes an increase of a powdered non-ionic surfactant during a catalyst preparation step in order to get rid of a formation of small size particles of said solid catalyst.

Japanese Patent Application, Publication Number 3-140308 discloses a production method of a polymerization catalyst for olefin, which is characterized in that a complex compound obtained from reacting an aluminium compound with alcohol in an inert organic solvent of which is stirred until it is mixed together at a temperature higher than its melting point by using a non-ionic surfactant, and then cooling down the suspended solution rapidly without a substantial loss of the alcohol. This results in a spherical solid composition. Then, said solid composition is partially dried, and treated with halogenated titanium or an electron donor compound.

However, the non-ionic surfactants disclosed in both Japanese Patents are surfactants in a sorbitan ester group. Use of the sorbitan ester in industrial scale can pose difficulties due to a low stability of its emulsion system and can consequently produce magnesium halide support with undesirable shape.

In order to solve this problem, the present invention aims to provide magnesium halide support and preparation for same for use as a composition of the catalyst in the olefin polymerization in order to achieve polymerized olefin with desirable spherical shape and narrow particle size distribution, as well as lower dust particles.

SUMMARY OF THE INVENTION

One aspect of the present invention is to provide a magnesium halide support for use as a composition of a catalyst in an olefin polymerization, wherein the magnesium halide support is a solid obtained from the preparation of an alcohol non-ionic surfactant which is an aliphatic alcohol, preferably an ethoxylated aliphatic alcohol.

Another aspect of the present invention is to provide a preparation process of a magnesium halide support for using as a composition of a catalyst in an olefin polymerization. The process comprising:
(a) adding the magnesium halide compound to an organic solvent, and heating;
(b) cooling down the mixture from (a) rapidly to the room temperature or lower in an inert organic solvent and an aliphatic alcohol non-ionic surfactant; and
(c) washing the magnesium halide support with an anhydrous inert organic solvent, and follow by drying,
wherein the non-ionic surfactant is preferably an ethoxylated aliphatic alcohol.

An objective of this invention is to provide the magnesium halide support with a spherical shape, and having a narrow particle size distribution, and it is preparation in order to use the same as a composition of a catalyst in an olefin polymerization.

Another objective is that the polyolefin from the catalyst with the magnesium halide support according to this invention will not cause the reactor fouling.

DETAILED DESCRIPTION OF THE INVENTION

The present invention relates to a magnesium halide support for using as a composition of the catalyst in the olefin polymerization, and a preparation process for the magnesium halide support, which will be described in various aspects as follows.

Any aspects shown here are also intended to include any applications to any other aspects of this invention, unless stated otherwise.

Definitions

Technical terms and scientific terms used herein have definitions as understood by those having an ordinary skill in the art, unless stated otherwise.

The use of singular noun or pronoun when used with the term "comprising" in the claims and/or specification means "one", and also includes "one or more", "at least one", and "one or more than one".

Throughout this application, the term "about" used to identify any values shown or appeared herein may be varied or deviated. The variation or deviation may be caused by errors of devices and methods used to determine a variety of values.

The terms "comprise", "have", and "include" are open-ended linking verbs. One or more forms of these verbs such as "comprise", "which comprise", "have", "which have", "include", "which include" are also open-ended. For example, any methods, which "comprise", "have", or "include" one or more steps, are not limited to possess only the one or those more steps, but also cover all unidentified steps.

Any instruments, devices, methods, or chemicals stated herein, unless stated otherwise, are intended to mean instruments, devices, methods, or chemicals that are used commonly by those skilled in the art.

All compositions and/or methods disclosed and claimed in this application are intended to cover any embodiments from any actions, operations, modifications, or essential changes without substantially different experiments from this invention, and to obtain anything which has properties, benefits, utilities, and effectiveness in the same manner to the aspect of the present invention in accordance with the opinion of the persons of an ordinary skill in the art, although there has not been any characterization in claims. Therefore, any replacement for or similarity to the aspects to the present invention, including any minor modifications or changes that are obvious to the persons skilled in the art, shall be considered to be within the intention, scope and spirit of the invention as recited in the appended claims of this patent.

A. Preparation of the Magnesium Halide Support

Unless specifically stated in this detailed description, the magnesium halide support according to this invention can be prepared by the processes known in the art such as spray drying, spray cooling, high pressure extruding, or high speed stirring including the preparation of the magnesium halide support under heating condition with final reaction temperature that is high enough to melt the magnesium halide complex solution and solidify as solid particles.

The magnesium halide support according to the invention includes magnesium chloride, magnesium bromide, and derivatives of magnesium chloride and magnesium bromide obtained via substitution of one or two halogen atoms of magnesium dichloride and magnesium dibromide by alkene aryl, alkoxy or aryloxy that have 1 to 14 carbon atoms.

Incidentally, examples of the magnesium halide supports include, but not limited to, magnesium dichloride, magnesium dibromide, phenoxy magnesium chloride, isopropoxy magnesium dichloride, and butoxy magnesium chloride, butyl octyl magnesium, butyl ethyl magnesium with magnesium dichloride. The magnesium halide support may be used alone or in combination with others in order to use as the composition of the catalyst.

In one embodiment of the invention is a preparation of the magnesium halide support through an aliphatic alcohol non-ionic surfactant.

Preferably, the aliphatic alcohol according to this invention is ethoxylated aliphatic alcohol comprising at least 1 but not over 12 ethoxylate groups.

More preferably, the aliphatic alcohol comprises 1 to 5 ethoxylate groups.

In one aspect of the invention, the aliphatic alcohol non-ionic surfactant may comprise at least one chain of 6 to 22 carbon atoms.

Preferably, the aliphatic alcohol according to this invention comprises at least one chain of 12 to 14 carbon atoms.

The non-ionic surfactant is an aliphatic alcohol which may be a saturated and unsaturated chain, wherein the chain has an even number of carbon atoms that may be a straight, branched, or non-aromatic ring chain.

In another aspect of the invention, the aliphatic alcohol non-ionic surfactant for the preparation of the magnesium halide support is selected from an octyl alcohol, octyl-decyl alcohol, decyl alcohol, lauryl alcohol, lauryl-miristyl alcohol, lauryl-cetyl alcohol, miristyl alcohol, cetyl alcohol, cetyl-stearyl alcohol, stearyl alcohol, and the like, or the mixture thereof.

In another aspect of the invention, the aliphatic alcohol non-ionic surfactant is obtainable from bio-based sources, preferably a palm oil.

In another embodiment of the invention, the preparation of the magnesium halide support through the aliphatic alcohol non-ionic surfactant consists of the following steps:

incidentally, unless stated otherwise, the aliphatic alcohol non-ionic surfactant is used in a liquid or semi-liquid phase where each step is proceeded under a nitrogen atmosphere;

(a) adding a magnesium halide compound into an organic solvent, and heating;

(b) cooling down the mixture from (a) rapidly to the room temperature or lower, in an inert organic solvent and the aliphatic alcohol non-ionic surfactant; and (c) washing the magnesium halide by the anhydrous inert organic solvent, and drying.

Preferably, the non-ionic surfactant is an ethoxylated aliphatic alcohol.

Preferably, the step (c) is proceeded under a vacuum or inert gas condition.

The preferable organic solvent in the step (a) is an alcohol or ether solvent.

The alcohol solvent used in the step (a) is the aliphatic alcohol with 1-10 carbon atoms, or the mixture thereof, that can be selected from ethanol, isopropanol, butanol, hexanol, octanol, and 2-ethyl hexanol.

The ether solvent used in the step (a) is the aliphatic or alicyclic ether with 2-6 carbon atoms, or the mixture thereof.

In one aspect of the invention, in step (a) the magnesium compound and the organic solvent are used in ratio 1:2-15.

In one aspect of the invention, the step (a) is proceeded at the temperature of 25-150° C.

The preferable inert organic solvent in the step (b) is an inert organic solvent with the boiling point of 30-200° C.

Preferably, the inert organic solvent in step (b) is selected from an alkane or aromatic compound with 5-12 carbon atoms, or the mixture thereof, that can be selected from pentane, hexane, heptane, dectane, or the like.

The preferable magnesium compound in this invention is the anhydrous magnesium chloride.

The mixing speed of each step in the preparation of the magnesium halide support is between 300-1200 rounds per minute.

The following example shows the present invention without a limitation to the scope of the invention.

The 0.02 mol anhydrous magnesium chloride ($MgCl_2$) was dissolved in 0.12-0.25 mol ethanol ($C_2H_5OH$) at the temperature higher than 90° C. at the stirrer speed of 300-900 rpm.

The mixture was precipitated immediately at the temperature of 0° C. in a 200 mL heptane solution ($C_7H_{16}$) with a 0.1-5% w/v non-ionic surfactant at the stirrer speed of 800-1200 rpm.

Then magnesium halide adduct was washed with an anhydrous hexane several times at the stirrer speed of 300-500 rpm and dried under a vacuum.

Incidentally, the magnesium halide support in a solid form will appear in the step (b).

The following is the preparation of the magnesium halide support in different forms according to this invention, which affects the shape and particle size distribution of the magnesium halide support.

I. Cooling Method

An experiment comparing effects of cooling methods on the shape and particle size distribution of the magnesium halide support was performed, and results of the experiment are shown in table 1 and FIG. 1.

TABLE 1

Effects of the cooling methods on the shape and particle size distribution of the magnesium halide support

| Cooling method | Particle sizes of magnesium halide support | | | |
|---|---|---|---|---|
| | D[3, 2] (μm) | Span | D[4, 3] (μm) | D50 (μm) |
| Slow cooling | 105.9 | 1.8 | 186.8 | 164.6 |
| Rapidly cooling | 28.2 | 2.0 | 58.5 | 50.6 |

II. Types of Surfactants

An experiment comparing effects of the surfactants on the shape and particle size distribution of the magnesium halide support was performed by not using any surfactant, using a sodium lauryl ether sulfate (SLES) surfactant, and a non-ionic surfactant according to this invention. The concentrations of surfactants were 1% w/v. and results of the experiment are shown in table 2 and FIGS. 2-5.

TABLE 2

Effects of the surfactants on the shape and the particle size distribution of the magnesium halide support

| types of surfactant | particle size of magnesium halide support | | |
|---|---|---|---|
| | D[3, 2] | D(50) | Span |
| no surfactant | 28.2 | 50.6 | 2.0 |
| SLES | 29.2 | 49.3 | 1.9 |
| non-ionic surfactant $R_x(OC_2H_4)_yOH$ | 29.8-32.5 | 55.2-61.2 | 1.9-2.0 |

Remarks: x is an integer between 12 to 14
y is an integer between 3 to 5
R is an alkyl group III. Concentrations of Surfactants An experiment comparing effects of concentration of the non-polar surfactant on the shape and particle size distribution of the magnesium halide support was performed, and results of the experiment are shown in table 3 and FIGS. 6.

TABLE 3

Effects of the concentrations of the non-ionic surfactant on the shape and the particle size distribution of the magnesium halide support

| concentrations of the non-ionic surfactant (% w/v) | particle sizes of magnesium halide support | | | |
|---|---|---|---|---|
| | D[3, 2] (μm) | Span | D[4, 3] (μm) | D50 (μm) |
| 0 | 35.2 | 1.9 | 67.1 | 59.4 |
| 0.5 | 42.9 | 2.1 | 91.4 | 76.3 |
| 1.0 | 41.7 | 1.9 | 77.6 | 66.8 |
| 1.5 | 28.0 | 1.7 | 50.6 | 45.2 |
| 2.0 | 28.0 | 1.5 | 46.2 | 42.9 |
| 3.0 | 21.1 | 1.4 | 32.0 | 29.3 |

BEST MODE OF THE INVENTION

Figure 1:
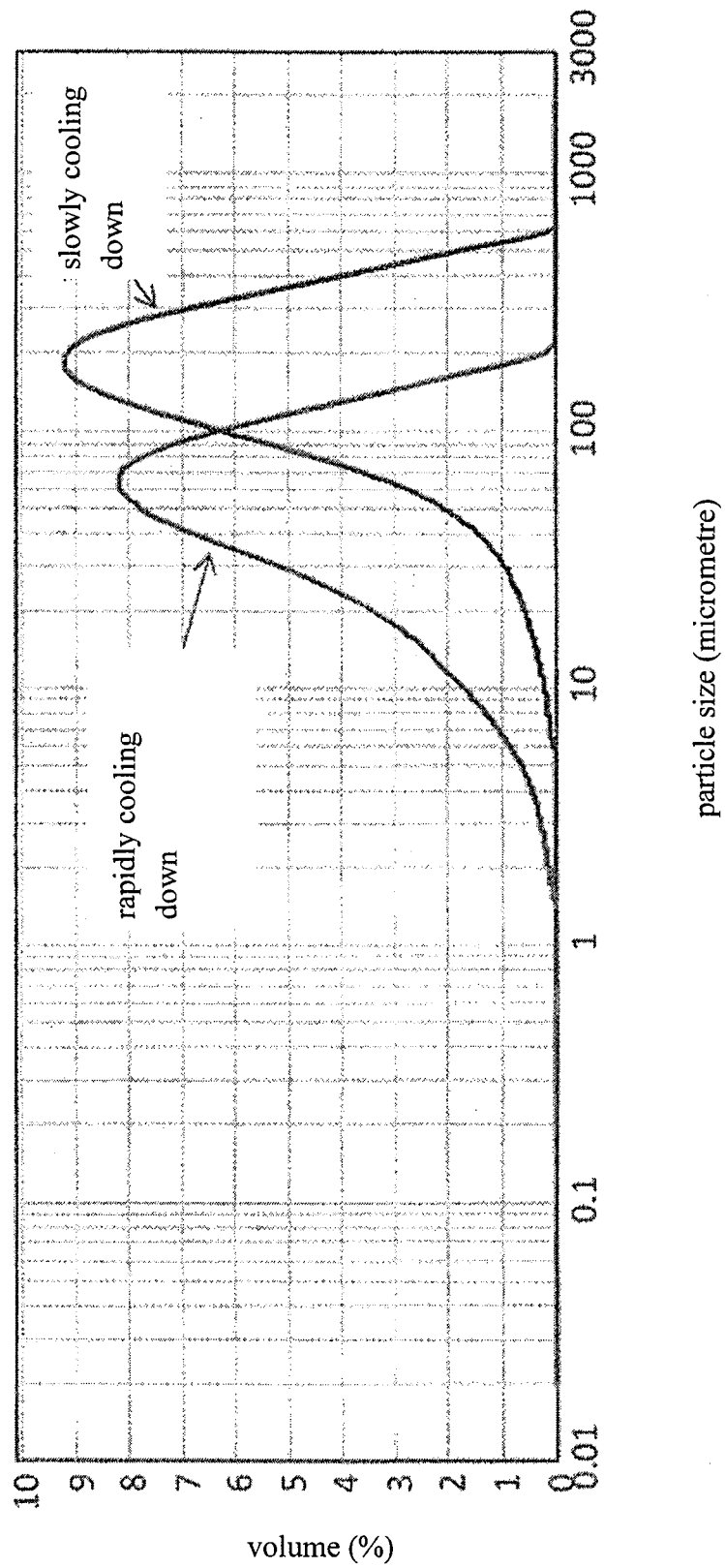
FIG. 1 shows the distribution graph of the particle sizes of the magnesium halide support prepared from the slow cooling and rapidly cooling method.
Figure 2:
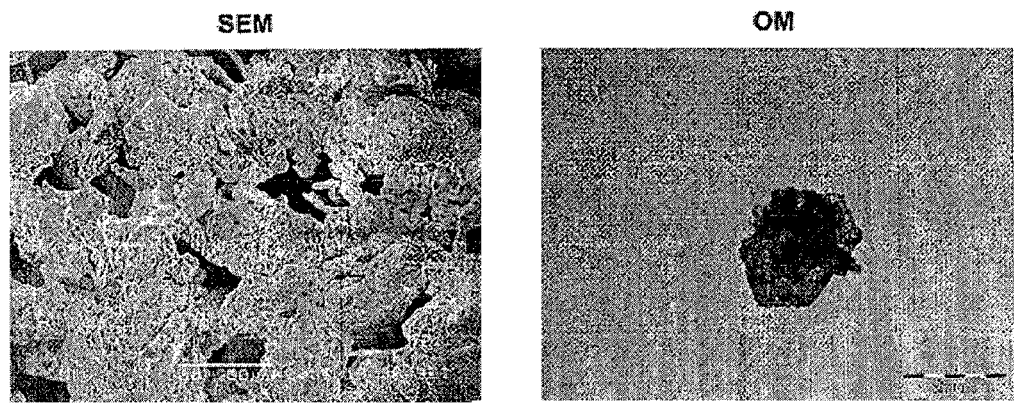
FIG. 2 shows pictures of a scanning electron microscope (SEM) and an optical microscope (OM) techniques of the magnesium halide support prepared with no surfactant.
Figure 3:
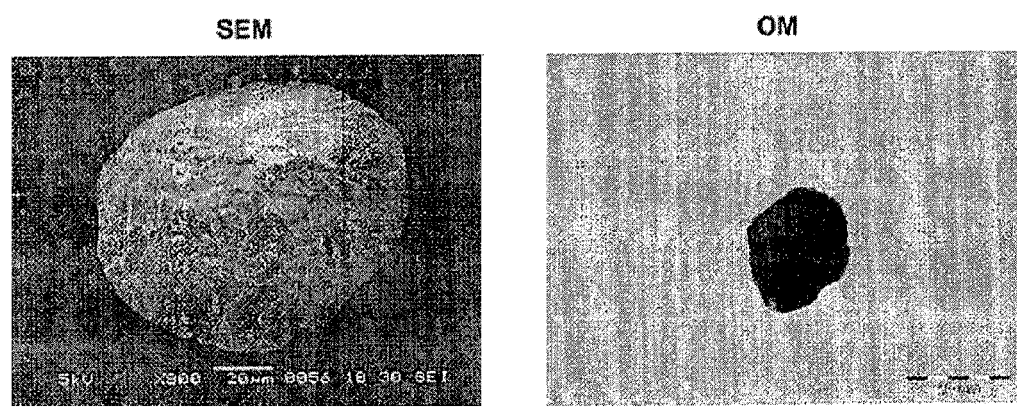
FIG. 3 shows pictures of a scanning electron microscope (SEM) and optical microscope (OM) techniques of the magnesium halide support prepared by sodium lauryl ether sulfate (SLES).
Figure 4:
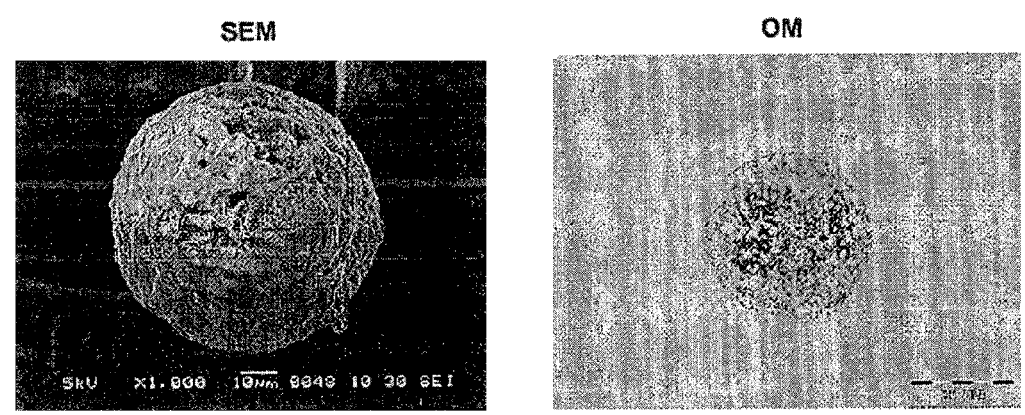
FIG. 4 shows pictures of a scanning electron microscope (SEM) and optical microscope (OM) techniques of the magnesium halide support prepared by non-ionic surfactant according to this invention.
Figure 5:
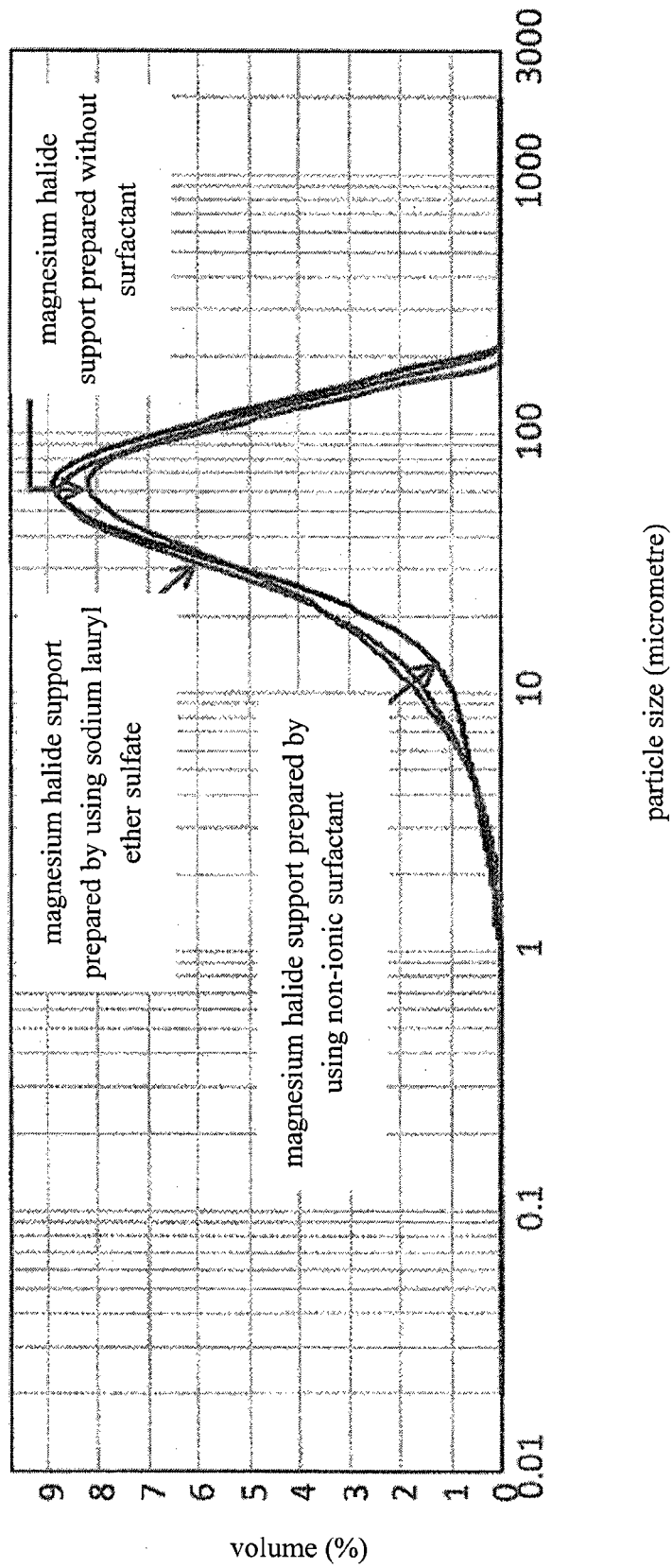
FIG. 5 shows distribution graph of particle size of the magnesium halide support prepared by using no surfactant, using sodium lauryl ether sulfate (SLES), and using non-ionic surfactant according to this invention.
Figure 6:
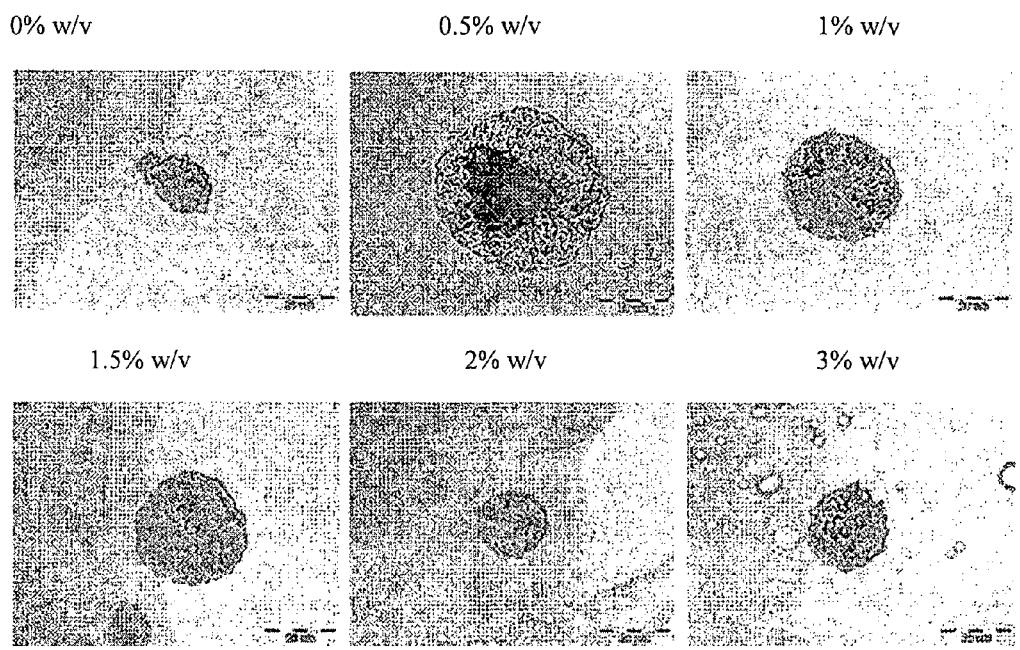
FIG. 6 shows optical microscope pictures of the magnesium halide support prepared by the non-ionic surfactant according to this invention at different concentrations.

Best mode of the invention is as disclosed in the detailed description.

We claim:

1. A method for preparing a magnesium halide support for using as a composition of a catalyst in an olefin polymerization comprising:
    (a) adding a magnesium halide compound into an organic solvent, and heating until the compound melt;
    (b) cooling down the mixture from (a) rapidly to a room temperature or lower in an inert organic solvent containing an aliphatic alcohol non-ionic surfactant selected from bio-based ethoxylated aliphatic alcohol in concentrations of 0.01-5% w/v; and
    (c) washing the magnesium halide adduct with an anhydrous inert organic solvent, and drying.

2. The method according to claim 1, wherein the aliphatic alcohol non-ionic surfactant comprises at least 1 to 12 ethoxylate groups.

3. The method according to claim 1, wherein the aliphatic alcohol non-ionic surfactant comprising at least 1 to 5 ethoxylate groups.

4. The method according to claim 1, wherein the aliphatic alcohol non-ionic surfactant comprising a chain of an even number of carbon atoms.

5. The method according to claim 1, wherein the aliphatic alcohol non-ionic surfactant is a mixture of saturated and unsaturated chains.

6. The method according to claim 1, wherein the aliphatic alcohol non-ionic surfactant comprising at least one chain of 6 to 22 carbon atoms.

7. The method according to claim 1, wherein the aliphatic alcohol non-ionic surfactant comprising at least one chain of 12 to 14 carbon atoms.

8. The method according to claim 1, wherein the aliphatic alcohol non-ionic surfactant comprising straight, branched, or non-aromatic ring chains.

9. The method according to claim 1, wherein the aliphatic alcohol non-ionic surfactant is selected from octyl alcohol, octyl-decyl alcohol, decyl alcohol, lauryl alcohol, lauryl-miristyl alcohol, lauryl-cetyl alcohol, miristyl alcohol, cetyl alcohol, cetyl-stearyl alcohol, stearyl alcohol, and the like, or a mixture thereof.

10. The method according to claim 1, wherein the aliphatic alcohol non-ionic surfactant is derived from palm oil.

11. The method according to claim 1, wherein the aliphatic alcohol non-ionic surfactant is present in a liquid or semi-liquid phase form.

12. The method according to claim 1, wherein the aliphatic alcohol non-ionic surfactant is present in concentrations of 0.5-3% w/v.

13. The method according to claim 1, wherein the aliphatic alcohol non-ionic surfactant is present in concentrations of 1-2% w/v.

14. The method according to claim 1, wherein the magnesium compound is an anhydrous magnesium compound.

15. The method according to claim 1, wherein the organic solvent in step (a) is alcohol or a mixture thereof.

16. The method according to claim 1, wherein the alcohol solvent in step (a) is aliphatic alcohol with 1-10 carbon atoms or a mixture thereof.

17. The method according to claim 1, wherein the alcohol solvent in step (a) is selected from ethanol, isopropanol, butanol, hexanol, octanol, 2-ethyl hexanol or a mixture thereof.

18. The method according to claim 1, wherein the ether solvent in step (a) is the aliphatic or alicyclic ether with 2-6 carbon atoms or a mixture thereof.

19. The method according to claim 1, wherein the magnesium compound and the organic solvent in step (a) is in the ratio of 1:2-15 by mole.

20. The method according to claim 1, wherein the step (a) is performed at the temperature of 25-150° C.

21. The method according to claim 1, wherein the magnesium halide support appears in a solid form in step (b).

22. The method according to claim 1, wherein the inert organic solvent in step (b) is aliphatic hydrocarbon, aromatic hydrocarbon or a mixture thereof.

23. The method according to claim 1, wherein the inert organic solvent in step (b) is the inert organic solvent with the boiling point of 30-200° C.

24. The method according to claim 1, wherein the inert organic solvent in step (b) is selected from an alkane or aromatic compound with 5-12 carbon atoms or a mixture thereof.

25. The method according to claim 1, wherein the mixing speed of each step in the preparation of the magnesium halide support is 300-1200 rounds per minute.

26. The method according to claim 1, wherein each step is performed under an inert gas atmosphere.

27. The method according to claim 1, wherein the drying in step (c) is performed under a vacuum or inert gas condition.

* * * * *